United States Patent [19]

Soejima et al.

[11] 3,805,016

[45] Apr. 16, 1974

[54] TUBULAR COMPOSITE WELDING WIRE FILLED WITH POTASSIUM COMPOUNDS CONTAINING FLUX

[75] Inventors: Kazuo Soejima, Fujisawa; Takeshi Sugahara; Kazuo Fukuda, both of Kawasaki; Kazuya Hashimura, Fujisawa, all of Japan

[73] Assignee: Nippon Oil and Fato Co., Ltd., Tokyo, Japan

[22] Filed: Dec. 3, 1971

[21] Appl. No.: 204,669

[30] Foreign Application Priority Data

Mar. 2, 1971 Japan.............................. 46-10870

[52] U.S. Cl................. 219/146, 117/202, 117/205, 117/206, 117/207, 219/73, 219/74, 219/137
[51] Int. Cl.............................................. B23r 35/22
[58] Field of Search............ 148/26; 29/194, 191.2; 117/202-207; 219/145, 146, 137, 73

[56] References Cited
UNITED STATES PATENTS

| | | | |
|---|---|---|---|
| 3,177,340 | 4/1963 | Danhier | 219/146 |
| 3,539,765 | 11/1970 | Pattera | 219/146 |
| 3,573,426 | 4/1971 | Blake | 219/146 |
| 2,544,334 | 3/1951 | Linnert | 117/205 |

FOREIGN PATENTS OR APPLICATIONS 278,435  6/1965  Australia.......................... 219/146

Primary Examiner—J. V. Truhe
Assistant Examiner—George A. Montanye
Attorney, Agent, or Firm—Sughrue, Rothwell, Mion, Zinn & Macpeak

[57] ABSTRACT

A tubular composite welding wire for use in the automatic or semi-automatic welding process, which comprises:

a. a tubular casing of a member selected from the group consisting of steel and a ferrous alloy and
b. a filler material containing a flux therein, in which said flux comprises a conventional fluxing agent composed of one or more of oxides, fluorides, alloying additives, carbonates and deoxidizing and denitrogenizing agents, and potassium dichromate and/or potassium chromate.

9 Claims, 11 Drawing Figures

FIG. IA 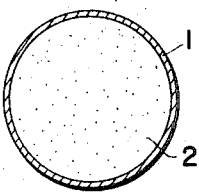
FIG. IB 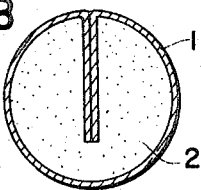

TUBULAR COMPOSITE WELDING WIRE FILLED WITH POTASSIUM COMPOUNDS CONTAINING FLUX

BACKGROUND OF THE INVENTION

1. Field of the Invention

This invention relates to a tubular composite welding wire filled with potassium compounds or mixtures of such containing a conventional fluxing agent used in the automatic or semi-automatic welding process, such as the submerged arc welding process, $CO_2$ gas arc welding process, inert gas arc welding process, with or without a shield gas or shield flux.

2. Description of the Prior Art

It will be noted that, hereinafter, the "wire" means the tubular composite welding wire filled with flux, the "shell" means the metallic tubular casing and the "flux" means the fluxing agent to be filled in the metallic tubular casing.

Conventional wires often cause the defects of "blow-holes" or formation of cracks in the welded metal and "excess spattering of molten metal drop" while subjected to the welding operation due to the moisture in the flux absorbed during storage or shipment. In order to eliminate such defects, a troublesome re-heating or drying treatment must be carried out just before the wire is used.

The excess spattering of the molten metal drops and the unstable arc generation are observed, even if the conventional wire has no moisture in the flux. This causes not only the waste of wire, but also the disturbance of the arc shielding atmosphere. As a result of this, $O_2$ and $N_2$ gases in the atmosphere fall into the molten metal after which blow-holes occur in the welded metal.

The irregular or unstable arc in the automatic or semi-automatic welding operation without a shield flux or shield gas diminishes the figure of the bead. This is especially true when the welding current is low or the velocity of the running torch is high, at which point a satisfactory bead is scarcely obtained with the conventional wire. A sufficient amount of fluoride and carbonate are incorporated with the flux to generate the shield gas from the wire itself for the purpose of protecting the molten metal from the atmosphere in case the external shield gas or shield flux is not applied to the wire. This shield gas is white and opaque to prevent the visual observation of the molten pool or its neighbor, and has an offensive odor to discomfort the welder.

Although the carbonate is an effective consistuent to generate the shield gas, the carbon caused by decomposition is alloyed with the welded metal to convert it into a higher carbon steel. Therefore, the amount of carbonate to add to the low carbon steel wire is restricted.

It is well known to add Al, Mg, Ti or Zr to the shell or the flux for preventing the entrappment of $O_2$ and $N_2$ gases in the welded metal. These deoxidizing and denitrogenizing elements, however, debase the fluidity of the fused slag and the detachability of the solidified slag, and are often retained as impurities in the welded metal. Therefore, the amount of deoxidizing and denitrogenizing elements to be added to the flux is also restricted.

As mentioned above, the conventional wire is not always suited for all the welding processes because of the various defects in practice.

SUMMARY OF THE INVENTION

This invention is intended to overcome the above defects in conventional wire, and is made on the discovery that the non-hygroscopic and readily fusible potassium dichromate and potassium chromate, when fused, will coat and protect the molten metal drops and flux to impart favorable fluidity to the latter and to make stable, the arc generation. Consequently, various types of welds can be obtained by adding various amounts and sorts of alloying elements and potassium compounds to the flux.

The tubular composite wire of the present invention used in the automatic and semi-automatic welding process, with or without shield gas or shield flux is produced by filling a green or baked flux mixture consisting of 1–15 wt. percent of potassium dichromate and/or potassium chromate and 99–85 wt. percent of the base flux as shown below into a tubular casing made of steel or ferrous alloy:

THE COMPOSITION OF THE BASE FLUX

Oxides: — 10–60 wt. percent
Fluorides: — 1–15 wt. percent
Alloying additives: — 15–60 wt. percent
Carbonates: — not more than 15 wt. percent
Deoxidizing and denitrogenizing agents: — not more than 7 wt. percent

BRIEF DESCRIPTION OF THE DRAWINGS

FIGS. 1A and 1B show a cross sectional view of the tubular composite welding wire filled with the flux.

DETAILED DESCRIPTION OF THE INVENTION

Figure 2:
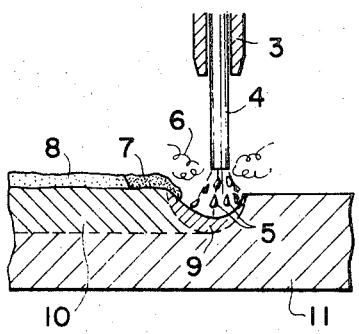
FIG. 2 shows a schematic view of the tubular composite welding wire and a metal article to be welded, both under the welding operation.

The aforementioned composition and the amount of each component of the base flux are determined by taking the properties and functions of each component into consideration.

The oxide is the primary component for forming the slag during the welding operation; the stable slag formation is not obtained when the amount of the oxide falls below 10 wt. percent, whereas more than 60 wt. percent of the oxide becomes detrimental to the actions or effects of the other components. Therefore, the optimum range of the oxide for introduction into the base flux is 10–60 wt. percent. This oxide may have the favorable fluidity and electric conductivity in the fused state, may be detached readily from the weld in the solidified state, non-hygroscopic and contribute to impart stable arc generation. One or more oxides selected from a group consisting of $TiO_2$, $MgO$, $Al_2O_3$, $SiO_2$, $CaO$, $FeO$, $Cr_2O_3$, $ZrO_2$ and the like metal oxides, and the double compound thereof, e.g., $CaO \cdot SiO_2$, may be used.

The fluoride in the fused state coats the molten metal drops hanging on and departed from the wire tip together with other fused fluxing components to prevent the mixing of $O_2$ and $N_2$ gases and also improves the fluidity of the fused flux. One or more fluorides selected from a group consisting of $CaF_2$, $MgF_2$, $AlF_3$, $Na_3AlF_6$ and the double compounds thereof are added to the base flux an amount of 1–15 wt. percent. The effect of the fluoride to protect the molten metal drops and to improve the fluidity of the slag is not observed by the addition of less than 1 wt. percent of the fluoride, whereas the stimulative odor and the spattering of the molten metal drops are caused by the addition of more than 15 wt. percent of the fluoride. Therefore, the fluoride may be added to the base flux in an amount of 1–15 wt. percent whether the shield gas or the shielded flux is used or not. The fluoride such as $CaF_2$, $MgF_2$, $AlF_3$ and $Na_3AlF_6$ must not contain water of crystallization therein.

The carbonate is decomposed thermally into the oxide and $CO_2$ gas during the welding operation, and the oxide formed serves as the slag forming agent, whereas the $CO_2$ gas generated serves as the arc protecting atmosphere. Too much of the carbonate accelerates the spattering of the molten metal drops because of the rapid expansion of the $CO_2$ gas generated by the thermal decomposition of the cabonate. When the amount of the carbonate exceeds 15 wt. percent, the spattering of the molten metal drops increases suddenly and the C content of the weld metal increases unwillingly to a range unfavorable for the welding of low C steel. Therefore, the upper limit of the carbonate to be added to the flux is detarmined as 15 wt. percent. One or more carbonates selected from a group consisting of $CaCO_3$, $BaCO_3$, $MnCO_3$, $MgCO_3$, $SrCO_3$ and the like metal carbonate, and the double compound thereof are used for this purpose. The addition of the carbonate is unnecessary if the shield gas or the shield flux is applied externally to the wire.

The alloying additives change and adjust the composition of the weld metal together with the shell metal, and improve the rate of shifting the molten metal to the weld, i.e., a combination between the shell metal and the alloying additives produces various types of weld metals. If the shield flux is applied externally to the wire, amount of alloying metal powders in the shield flux can be saved or substituted with that of the alloying additives in the filled flux, this improving the welding works and stabilizing the composition of the weld metal. One or more elements selected from Fe, Ni, Mn, Cr, Mo, Nb, Cu, Co, Si or alloys thereof or Fe-alloys containing said elements are added solely or combined to the flux in an amount of 15–60 wt. percent. The lower limit of the addition of the alloying elements is determined by taking the yield of the latter into consideration, whereas the upper limit is determined as the highest amount, which can be used and yet will not prevent the action of the other components. Some of these alloying elements serve as the deoxidizing and/or denitrogenizing agents.

The deoxidizing and denitrogenizing agent such as one or more metallic elements selected from Al, Ti, Mg or alloys thereof or Fe-alloys containing these elements is used solely or combined. If the amount of deoxidizing and denitrogenizing agent exceeds 7 wt. percent, the solidified slag sticks fixedly to the weld metal and requres troublesome after treatments. In the case where the shell contains such deoxidizing and denitrogenizing elements, the flux need not contain the latter. Therefore, the upper limit of the amount of the deoxidizing and denitrogenizing agents is selected as 7 wt. percent.

In the present invention potassium dichromate or potassium chromate or these mixtures is added to the above components as a base flux in an amount of from 1–15 wt. percent. These potassium compounds in the fused state cover and protect the drops of the molten metal and increase the fluidity of the formed slag, which will protect the weld metal surface from the external atmosphere, thus stabilizing the arc generation. As these potassium compounds having the relatively low melting point are fused more rapidly than the other components by the Joule's heat generated in the shell and transmitting heat from the melted wire end, the base flux is fused uniformly at the wire end. This accelerates the action of the components for coating and protecting the molten metal drops, and especially that of the fluoride. Besides, the potassium ion derived from the fused potassium compounds disperses uniformly over the whole cross sectional area of the wire, the local or irregular arc generation over the wire cross section is substantially prevented and the size of the molten metal drops are reduced. Furthermore, the generation of the stimulative odor is minimized due to the suppression of the excess and unnecessary decomposition of the fluoride. Furthermore, the spattered particles become fine and small by the addition of these potassium compounds. Still further, the effect of these potassium compounds is to accelerate the detachability of the solidified slag layer from the weld metal surface. These favorable effects are well exhibited when the amount of these potassium compounds in the base flux is more than 1 wt. percent, but when it exceeds 15 wt. percent, the melting point of the slag is unwillingly lowered and the welding operation becomes difficult.

Now, the aforementioned advantages of this invention will be described with reference to the following Examples and accompanied drawings which are merely intended to be illustrative and not limitative.

EXAMPLE 1

Figure 3:
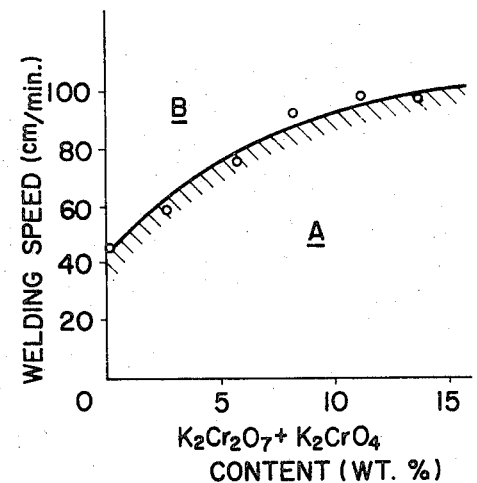
FIG. 3 shows a graph exhibiting a relation between the welding speed and the welding bead produced, using the wire of this invention.

A series of composite welding wires were produced by filling 35 parts by weight of a flux mixture composed of $TiO_2$: 20 wt. percent and $SiO_2$: 10 wt. percent as the oxide, Fe: 6 wt. percent, Ni: 3 wt. percent and Fe-Cr: 28 wt. percent as the alloying additives, Al: 3 wt. percent as the deoxidizing and denitrogenizing agent, $CaCO_3$: 10 wt. percent as the carbonate, $CaF_2$: 10 wt. percent as the fluoride, the mixture of $K_2Cr_2O_7$ and $K_2CrO_4$: 0–15 wt. percent as the potassium compound into 65 parts by weight of a shell or tubular casing having the outer diameter of 3.2 mm and made from a steel composed of C: 0.022 wt. percent, Mn: 1.75 wt. percent, Si: 0.41 wt. percent P: 0.012 wt. percent, S: 0.009 wt. percent, Ni: 9.88 wt. percent, Cr: 19.15 wt. percent, Mo: 2.50 wt. percent, the balance being Fe and changing the amount of the potassium compound in the flux. The continuity of the welding bead was tested on the wires described above as changing the welding velocity under the welding current of 150 amp. The test results are shown in the FIG. 3, wherein (A) shows a zone in which the bead is continuous and (B) shows a zone in which the bead is discontinuous.

EXAMPLE 2

A series of composite welding wires produced in a similar manner as in the Example 1, except for changing the amount of $CaF_2$ as the fluoride in the flux as 0, 5, 10 and 15 wt. percent together with the amount of the mixture of $K_2Cr_2O_7$ and $K_2CrO_4$. Another series of composite welding wires were produced similarly as with the above wire series by changing the amount of $CaCO_3$, in place of $CaF_2$, as 0, 5, 10 and 15 wt. percent together with the amount of the mixture of $K_2Cr_2O_7$ and $K_2CrO_4$.

Figure 4:
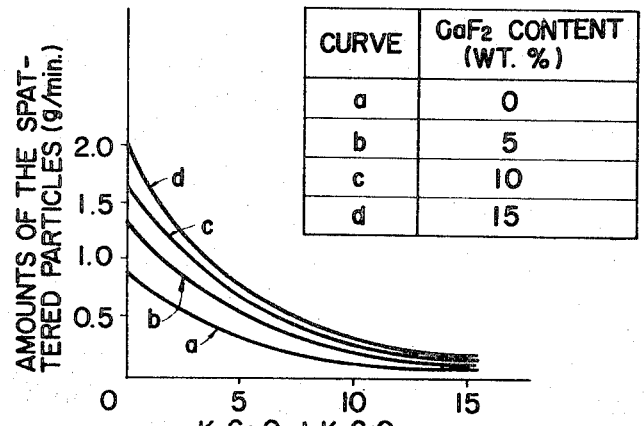
FIGS. 4 and 5 show a graph indicating a relation between compositions of the flux and amounts of the spattered particles.
Figure 5:
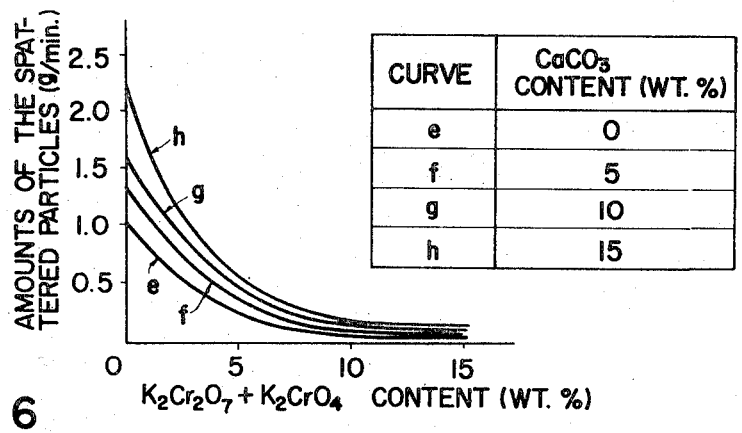

A relation between the change of the $CaF_2$ amount and the weight of the spattered particles during the welding operation is shown in FIG. 4, whereas a relation between the change of the $CaCO_3$ amount and the weight of the spattered particles was tested on the series of the wires, and the test results are shown in the FIG. 5. Though in this test a shield gas or shield flux was not used, similar results were obtained in the test with shield gas or shield flux.

EXAMPLE 3

A series of the composite welding wires produced in a similar manner in the Example 1, except for changing the amount of $CaF_2$ as the fluoride in a range of 1–15 wt. percent together with that of the mixture of $K_2Cr_2O_7$ and $K_2CrO_4$ in a range of 0–15 wt. percent.

Figure 6:
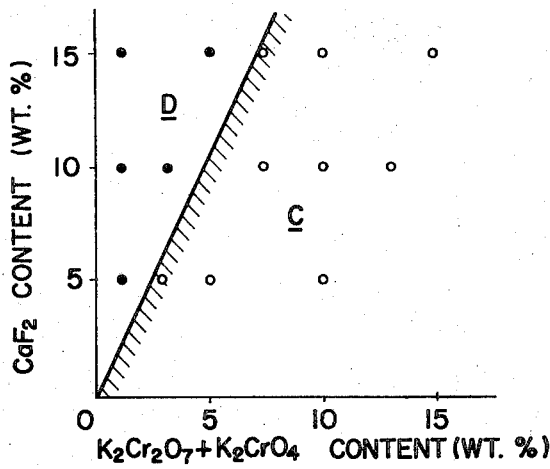
FIG. 6 shows a graph indicating a relation between the composition of the flux and the odor caused during the welding works.

A relation between the change of the flux components (fluoride and potassium compound) and the stimulative odor was tested on the series of the wires, and the test results are shown in the FIG. 6, wherein (C) is a zone in which the stimulative odor is not present and (D) is a zone in which the odor is present.

EXAMPLE 4

Figure 7:
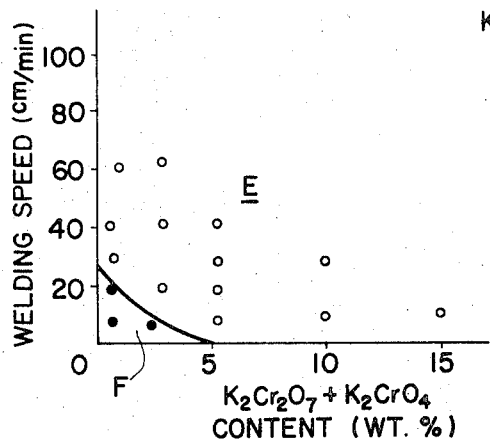
FIG. 7 shows a graph exhibiting a relation between the composition of the flux and the facilitation of the observation of the molten pool.

A relation between the welding speed and a capability of observing the molten pool from a point above the welding torch was tested on the wires as described in the Example 1. The test results are shown in the FIG. 7, wherein (E) is a zone from which the observation of the molten pool is easy and (F) is a zone from which the observation is difficult.

EXAMPLE 5

A series of composite welding wires W-11 were produced by filling the flux mixture composed of $TiO_2$: 30 wt. percent, CaO·SiO2: 20 wt. percent and $Al_2O_3$: 2 wt. percent as the oxide, $CaCO_3$: 7 wt. percent and $BaCO_3$: 3 wt. percent as the carbonate, Fe: 10 wt. percent, Fe-Mn: 5 wt. percent and Fe-Si: 2 wt. percent as the alloying additives, Fe-Al: 3 wt. percent as the deoxidizing and denitrogenizing agent, $CaF_2$: 5 wt. percent and $AlF_3$: 3 wt. percent as the fluoride, and a mixture of $K_2Cr_2O_7$ and $K_2CrO_4$: 0–15 wt. percent into a shell or the tubular casing of a carbon steel composed of C: 0.092 wt. percent, Mn: 0.40 wt. percent, Si: 0.12 wt. percent, P: 0.021 wt. percent, S: 0.011 wt. percent, the balance being Fe and changing the amount of the potassium compounds in the flux.

A series of composite welding wires W-12 were produced in a similar manner as the above W-11 series, except for containing none of the carbonate.

A series of composite welding wires W-13 were produced by removing the carbonate and the deoxidizing and denitrogenizing agent from the flux of the W-11 series wires.

A series of composite welding wires W-14 were produced by removing the carbonate, the deoxidizing and the denitrogenizing agent and the fluoride from the flux of the W-11 series wires.

Figure 8:
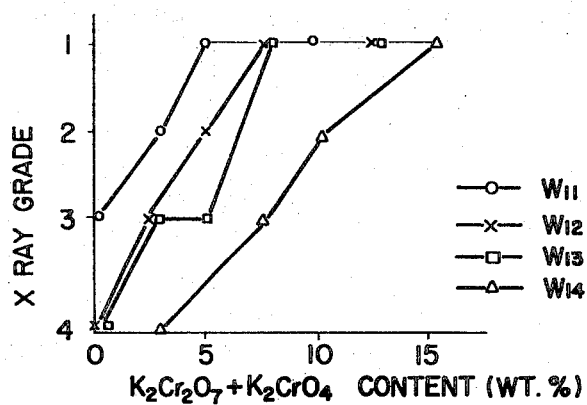
FIG. 8 shows a graph exhibiting a relation between the composition of the flux and the amount of blow-holes in the welded metal.

These four groups of the wires of W-11, W-12, W-13 and W-14 were applied to the welding operation without a shield gas or shield flux, and the weld metals obtained were subjected to an X-ray test to detect the blow-holes therein. The test results are shown in the FIG. 8 as indicated by four grades.

EXAMPLE 6

Figure 9:
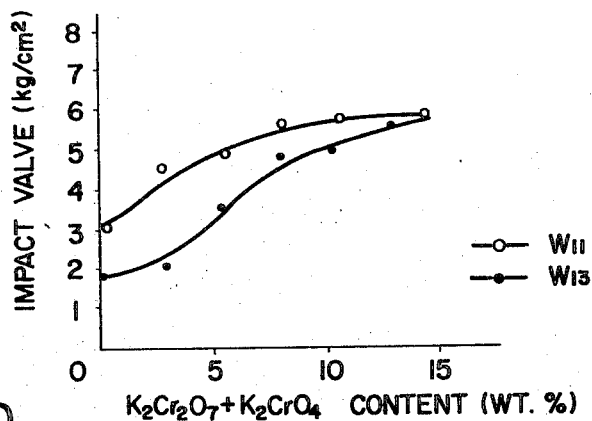
FIG. 9 shows a graph exhibiting a relation between the composition of the flux and the impact value in the welded metal.

Two series of the composite welding wires W-11 and W-13 in the Example 5 were applied to the welding operation, and the resultant weld metals were subjected to the Charpy Impact Strength Test at 0°C. with a 2-V notch test piece. The test results are shown in the FIG. 9.

EXAMPLE 7

Figure 10:
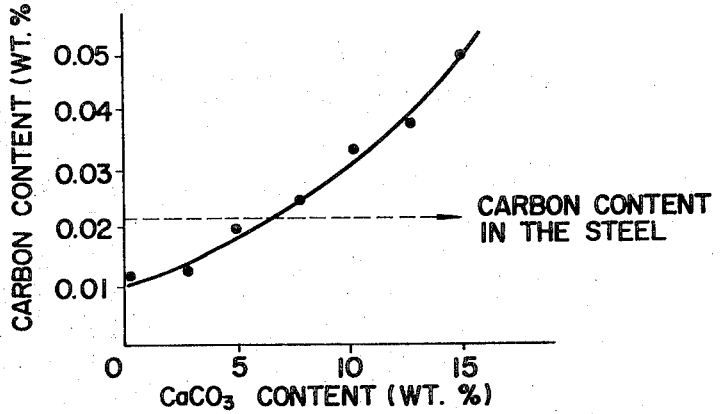
FIG. 10 shows a graph exhibiting a relation between the amount of $CaCO_3$ in the flux and C content in the welded metal.

A series of composite welding wires produced by filling a flux mixture composed of $TiO_2$: 30 wt. percent and CaO·SiO2: 10 wt. percent as the oxide, Fe-Cr: 15 wt. percent, Fe-Mn: 14 wt. percent and Ni: 5 wt. percent as the alloying additives, Al-Ti: 1 wt. percent as the deoxidizing and denitrogenizing agent, $AlF_3$: 10 wt. percent as the fluoride, $K_2Cr_2O_7$: 5 wt. percent and $K_2CrO_4$: 5 wt. percent as the potassium compound and $CaCO_3$: 0–15 wt. percent as the carbonate into a shell of a steel composed of C: 0.022 wt. percent, Mn: 1.75 wt. percent, Ni: 9.88 wt. percent, Cr: 19.15 wt. percent, Mo: 2.50 wt. percent, Si: 0.41 wt. percent, P: 0.012 wt. percent, S: 0.009 wt. percent, the balance being Fe. The weld metal was produced by the wires without a shield gas or shield flux. A relation between the amount of the $CaCO_3$ in the flux and the C content in the weld metal is shown in the FIG. 10.

EXAMPLE 8

5 flux compositions F-1 to F-5, as shown in the following Table 1, were dried at 250°C. for 1 hour, and then exposed to room atmosphere kept at 25°C. and 80 percent humidity for 100 days. After that, the moisture in the fluxes F-1 to F-5 was measured.

On the other hand, the wire W-2 composed of the shell H-2 shown in Table 4 and the flux F-2 shown in Table 1, a commercial wire X and a wire Y produced by filling a titannia flux, which was obtained from the usual coated arc welding rod into a shell H-2 were treated in the same manner as for said 5 fluxes, and each of the fluxes in the shell was taken out from the latter. The moisture of these 3 fluxes was also measured. The moisture of the former 5 fluxes and that of the latter 3 fluxes are shown in Table 2.

TABLE 1.—The Composition of the Flux

| Components | | Flux compositions (wt. percent) | | | | |
|---|---|---|---|---|---|---|
| | | F-1 | F-2 | F-3 | F-4 | F-5 |
| Oxides | $TiO_2$ | 30 | 30 | 25 | 25 | 5 |
| | MgO | | | | | 10 |
| | $CaO \cdot SiO_2$ | 20 | 10 | | 3 | 5 |
| | $Al_2O_3$ | 2 | | 5 | | |
| Carbonates | $CaCO_3$ | 7 | 5 | 10 | 15 | 3 |
| | $BaCO_3$ | 3 | | | | |
| Alloying additives | Fe | 10 | 6 | | | 13 |
| | Fe-Mn | 5 | 5 | 15 | 10 | 9 |
| | Fe-Si | 2 | 5 | 5 | 5 | 5 |
| | Fe-Cr | | 15 | 15 | 15 | 15 |
| | Ni | | 3 | 5 | 5 | 10 |
| Deoxidizing and denitrogenizing agents. | Al-Ti | | 1 | | 2 | 2 |
| | Fe-Al | 3 | | | | 4 |
| Fluorides | $CaF_2$ | 5 | | | | 10 |
| | $AlF_3$ | 3 | 10 | 10 | 10 | 5 |
| Potassium compounds | $K_2Cr_2O_7$ | 10 | 5 | 5 | | 4 |
| | $K_2CrO_4$ | | 5 | 5 | 10 | |

TABLE 2.—Moisture in the Flux and Wire

| Condition | Flux (wt. percent) | | | | | | | |
|---|---|---|---|---|---|---|---|---|
| | F-1 | F-2 | F-3 | F-4 | F-5 | W-2 | X | Y |
| Immediately after the drying | 0.11 | 0.11 | 0.10 | 0.11 | 0.11 | 0.11 | 0.12 | 0.15 |
| 5 days after the drying | .12 | .11 | .11 | .12 | .12 | .11 | 1.00 | 1.20 |
| 50 days after the drying | .12 | .11 | .11 | .12 | .12 | .11 | 1.86 | 1.96 |
| 100 days after the drying | .12 | .12 | .11 | .12 | .13 | .11 | 1.88 | 1.96 |

Table – 3 Specification of the Wire

| Wire No. | Dia. | Shell composition | Shell Ratio | Flux | Flux Ratio |
|---|---|---|---|---|---|
| W-1 | 3.2 mm | H-1 | 68 % | F-1 | 32 % |
| W-2 | 3.2 | H-2 | 65 | F-2 | 35 |
| W-3 | 3.2 | H-3 | 65 | F-3 | 35 |
| W-4 | 3.2 | H-4 | 65 | F-4 | 35 |
| W-5 | 3.2 | H-2 | 65 | F-5 | 35 |

TABLE 4.—Composition of the Shell

| Shell No. | (Wt. percent) | | | | | | | |
|---|---|---|---|---|---|---|---|---|
| | C | Mn | Si | P | S | Ni | Cr | Mo |
| H-1 | 0.092 | 0.40 | 0.12 | 0.021 | 0.011 | | | |
| H-2 | .022 | 1.75 | .41 | .012 | .009 | 9.88 | 19.15 | 2.50 |
| H-3 | .065 | 7.66 | .12 | .025 | .012 | 9.56 | 19.01 | |
| H-4 | .25 | 1.23 | .25 | .019 | .010 | 40.00 | 20.15 | |

It is apparent from the Tables that the preferable flux mixture having the non-hygroscopic property and providing a favorable welding effect is composed of 20–52 wt. percent oxide, not more than 6 wt. percent deoxidizing and denitrogenizing agent, 3–15 wt. percent carbonate, 8–15 wt. percent fluoride, 17–52 wt. percent alloying additives, and 4–10 wt. percent of the potassium compound.

EXAMPLE 9

Five wires W-1, W-2, W-3, W-4, and W-5 shown in the Tables 3 and 4 were applied to a welding operation under the conditions described in Table 5. The results of the welding test are shown in the Table 6, and indicate that the W-1 to W-5 are capable of providing favorable weld metal and facilitate the welding operation.

TABLE 5.—Welding Conditions

| Test No. | Wire No. | Power source | Electric current (A) | Voltage (V) | Shield gas or shield flux |
|---|---|---|---|---|---|
| T-1 | W-1 | A.C. | 350 | 28–30 | |
| T-2 | W-2 | A.C. | 350 | 28–30 | |
| T-3 | W-3 | A.C. | 350 | 28–30 | |
| T-4 | W-4 | A.C. | 350 | 28–30 | |
| T-5 | W-5 | D.C.R.P. | 350 | 20–25 | Shield flux composed of $ZrO_2$, $SiO_2$ 20%, MgO 40% and $Al_2O_3$ 40%. |
| T-6 | W-2 | A.C. | 350 | 28–30 | Pure Ar with the flow-rate of 20 l/min. |

TABLE 6. — Test Results

| Test No. | | T-1 | T-2 | T-3 | T-4 | T-5 | T-6 |
|---|---|---|---|---|---|---|---|
| Composition of the weld metal (wt. %). | C | 0.095 | 0.020 | 0.070 | 0.32 | 0.017 | 0.025 |
| | Mn | 0.50 | 1.66 | 7.75 | 2.03 | 1.95 | 1.72 |
| | Si | 0.45 | 0.44 | 0.25 | 0.40 | 0.62 | 0.39 |
| | P | 0.021 | 0.012 | 0.024 | 0.015 | 0.014 | 0.020 |
| | S | 0.010 | 0.009 | 0.011 | 0.009 | 0.009 | 0.010 |
| | Ni | | 9.85 | 9.50 | 39.93 | 11.02 | 9.64 |
| | Cr | | 19.26 | 19.12 | 20.05 | 19.32 | 19.54 |
| | Mo | | 2.45 | | | 2.20 | 2.48 |
| | Total N | | 0.10 | 0.09 | 0.10 | 0.10 | 0.04 |
| Mechanical properties of the weld metal (as welded). | Yield point (Kg/mm$^2$) | 40.5 | | | | | |
| | Tensile strength (Kg/mm$^2$) | 52.6 | 60.1 | 59.73 | 73.3 | 61.0 | 64.8 |
| | Elongation (%) | 24.3 | 44.1 | 45.4 | 18.6 | 43.0 | 40.9 |
| | 2V notch impact value at 0°C. (Kg-m/cm$^2$). | 5.8 | 10.3 | 11.6 | 3.8 | 10.1 | 10.0 |
| Corrosion resistance (weight loss) in. | 5% H$_2$SO$_4$ aq. solution (g/m$^2$/hr). | | 4.3 | | | 4.28 | 4.57 |
| | 65% HNO$_3$ aq. solution (g/m$^2$/hr) | | 0.81 | | | 0.84 | 0.95 |
| X ray test (grade) | | 1 | 1 | 1 | 1 | 1 | 1 |
| Odor | | no | no | no | no | no | no |
| Appearance of the bead | | fine | fine | fine | fine | fine | fine |
| Peeling-off property of the solidified slag | | good | good | good | good | good | good |
| Arc stability | | do | do | do | do | do | do |
| Spattered drops | | little | fine & little | fine & little | little | little | little |
| Moisture absorption of the wire | | no | no | no | no | no | no |

As described above, by including a potassium compound in the resultant flux mixture, the increase of the welding speed, the decrease of the spattered particles, the prevention of the discomforting odor and easy observation of the molten pool were obtained.

In addition, results of the X-ray test and the impact strength test to the welded metal of the present invention indicate that the quality of said welded material is improved by containing the potassium compound.

While this invention has been described with reference to particular embodiments thereof, it will be understood that numerous modifications and changes may be made by those skilled in the art without actually departing from the spirit and scope thereof.

Therefore, the appended claims are intended to cover all such equivalent variations as coming within the true spirit and scope of this invention.

What is claimed is:

1. A tubular composite welding wire for use in the automatic or semi-automatic welding process, which comprises:
   1. a tubular casing composed of a member selected from the group consisting of steel and a ferrous alloy; and
   2. contained within said tubular casing, a green and baked flux mixture comprising from 1 to 15 percent by weight, based on the weight of the mixture, of at least one member selected from the group consisting of potassium dichromate and potassium chromate and from 85 to 99 percent by weight, based on the weight of the mixture, of a base flux composed of, in percentages by weight based on the weight of the flux, from 10 to 60 percent of oxides, from 1 to 15 percent of fluorides, from 15 to 60 percent of alloying additives, no more than 15 percent of carbonates and no more than 7 percent of deoxidizing and denitrogenizing agents.

2. The tubular composite welding wire of claim 1, wherein said oxides are selected from the group consisting of TiO$_2$, MgO, Al$_2$O$_3$, SiO$_2$, CaO, FeO, Cr$_2$O$_3$, ZrO$_2$, double compounds thereof and mixtures of the same.

3. The tubular composite welding wire of claim 1, wherein said fluorides are selected from the group consisting of CaF$_2$, MgF$_2$, AlF$_3$, Na$_3$AlF$_6$, double compounds thereof and mixtures of the same.

4. The tubular composite welding wire of claim 1, wherein said carbonates are selected from the group consisting of CaCO$_3$, BaCO$_3$, MnCO$_3$, MgCO$_3$, SrCO$_3$ and mixtures thereof.

5. The tubular composite welding wire of claim 1, wherein said alloying additives are selected from the group consisting of Fe, Ni, Cr, Mo, Mn, Nb, Cu, Co, Si, alloys thereof, Fe-alloys containing the same and mixtures thereof.

6. The tubular composite welding wire of claim 1, wherein said deoxidizing and denitrogenizing agents are selected from the group consisting of Al, Ti, Mg, alloys thereof, Fe-alloys containing the same and mixtures thereof.

7. A tubular composite welding wire for use in the automatic or semi-automatic welding process, which comprises:
   1. a tubular casing composed of a member selected from the group consisting of steel and a ferrous alloy; and
   2. contained within said tubular casing, a green and baked flux mixture comprising from 4 to 10 percent by weight, based on the weight of the mixture, of at least one member selected from the group consisting of potassium dichromate and potassium chromate and from 90 to 96 percent by weight, based on the weight of the mixture, of a base flux composed of, in percentages by weight based on the weight of the base flux, from 20 to 52 percent of at least one member selected from the group consisting of TiO$_2$, MgO, CaO·SiO$_2$ and Al$_2$O$_3$, from 3 to 15 percent of at least one member selected from the group consisting of CaCO$_3$ and BaCO$_3$, from 17 to 52 percent of at least three members selected from the group consisting of Fe, Fe-Mn, Fe-Si, Fe-Cr and Ni, from 0 to 6 percent of at least one member selected from the group consisting of Al-Ti and Fe-Al and from 8 to 15 percent of at least one member selected from the group consisting of CaF$_2$ and AlF$_3$.

8. The tubular composite welding wire of claim 3 wherein said fluorides are free of water of crystallizations.

9. A tubular composite welding wire for use in the automatic or semi-automatic welding process, said wire comprising:

1. a tubular casing composed of a member selected from the group consisting of steel and a ferrous alloy; and
2. contained within said tubular casing, a green and baked flux mixture consisting essentially of from 1 to 15 percent by weight, based on the weight of said flux mixture, of at least one member selected from the group consisting essentially of, in percentages by weight based on the weight of said base flux, from 10 to 60 percent of at least one oxide selected from the group consisting of $TiO_2$, $MgO$, $Al_2O_3$, $SiO_2$, $CaO$, $FeO$, $Cr_2O_3$, $ZrO_2$ and double compounds thereof; from 1 to 15 percent of at least one fluoride containing no water of crystallization selected from the group consisting of $CaF_2$, $MgF_2$, $AlF_3$, $Na_3AlF_6$ and double compounds thereof; from 15 to 60 percent of at least one alloying additive selected from the group consisting of Fe, Ni, Cr, Mo, Mn, Nb, Cu, Co, Si, alloys thereof and Fe-alloys containing the same; from 0 to 15 percent of at least one carbonate selected from the group consisting of $CaCO_3$, $BaCO_3$, $MnCO_3$, $MgCO_3$ and $SrCO_3$; and from 0 to 7 percent of at least one deoxidizing and denitrogenizing agent selected from the group consisting of Al, Ti, Mg, alloys thereof and Fe-alloys containing the same.

* * * * *